July 2, 1957  H. ROBB  2,797,438
STEAM HEATED PATCHING MEANS FOR AUTOMOTIVE TIRE CASINGS
Filed July 6, 1954  3 Sheets-Sheet 2
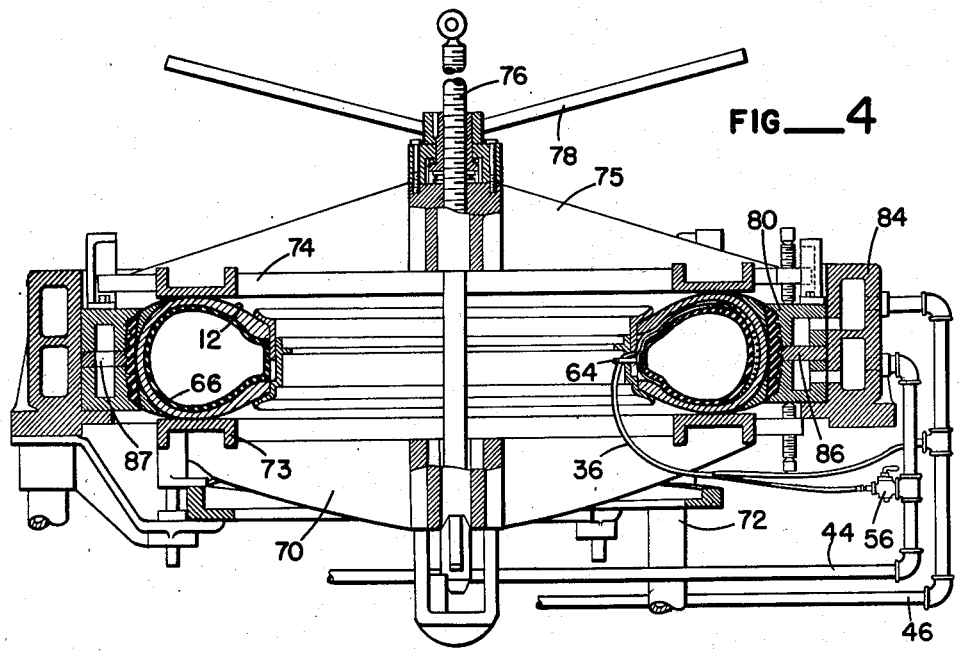
FIG__4
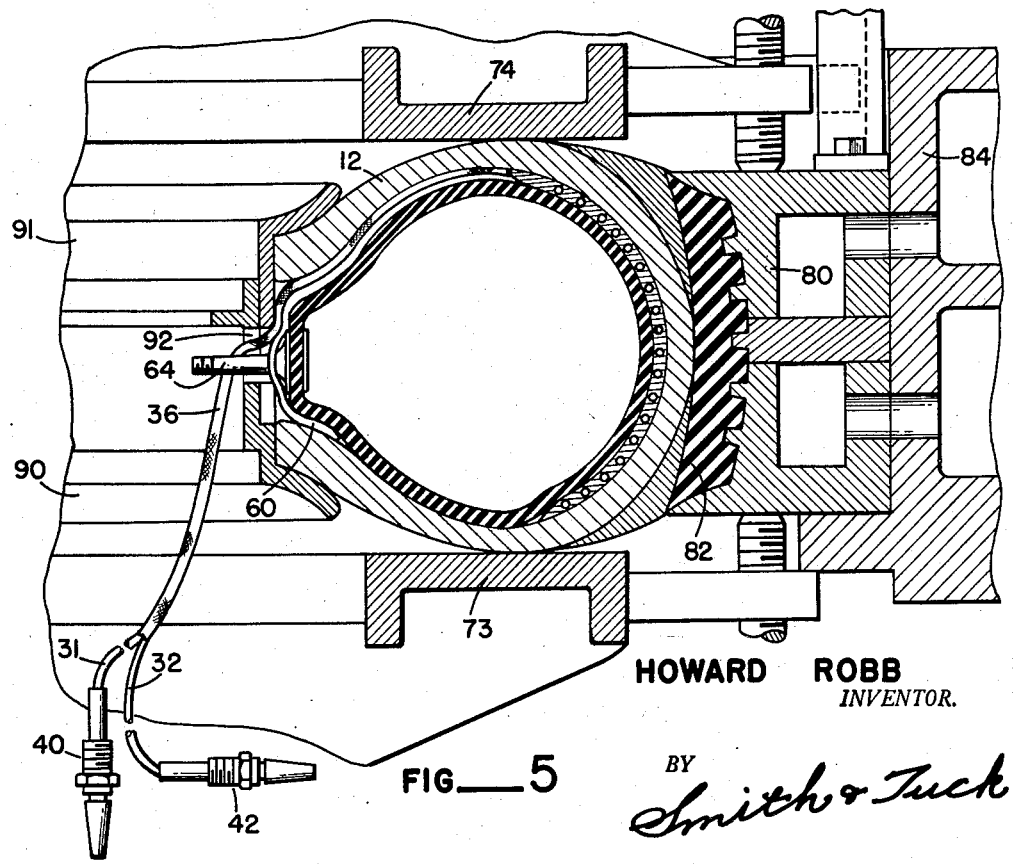
FIG__5
HOWARD ROBB
INVENTOR.
BY
Smith & Tuck

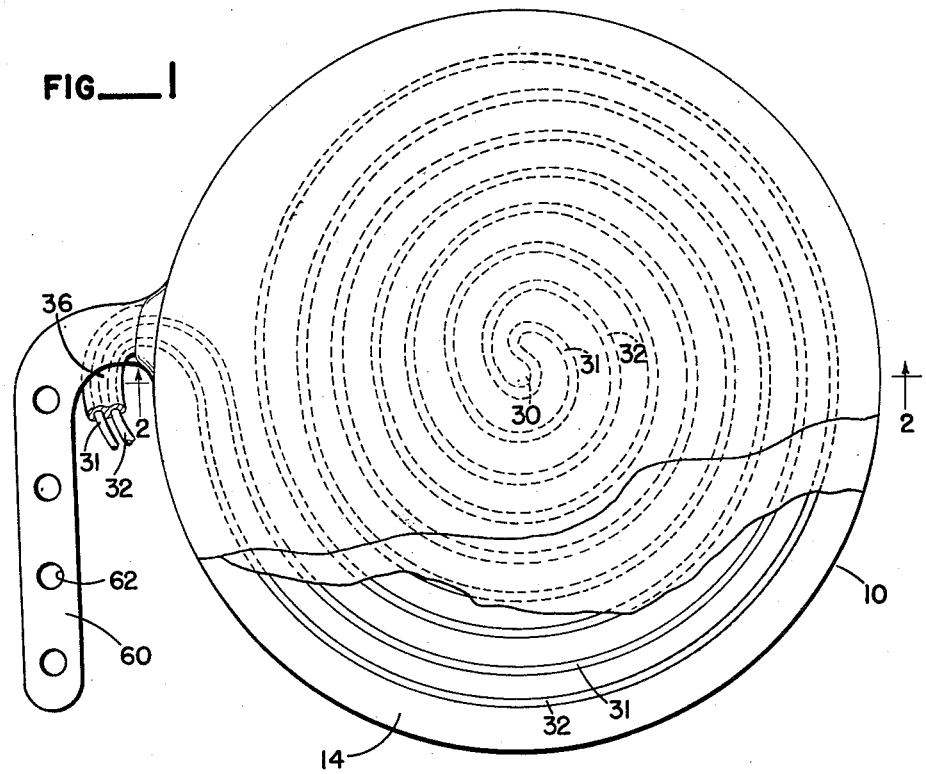
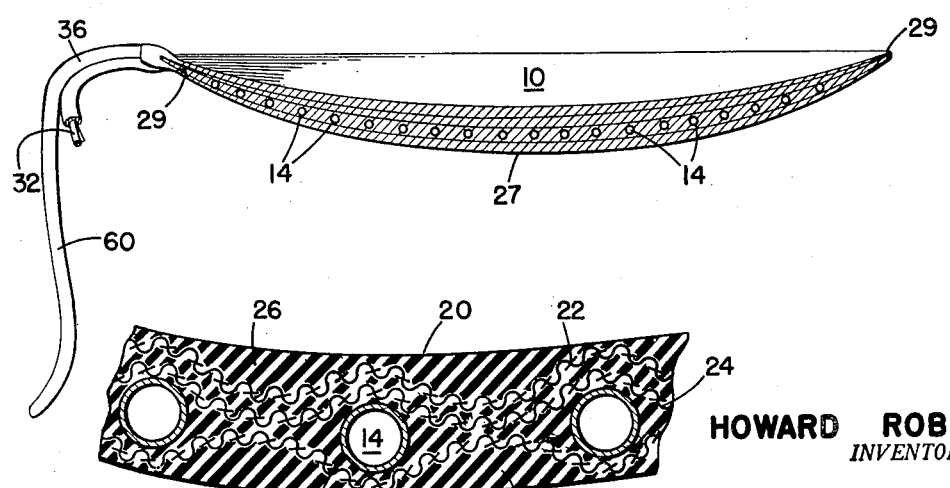

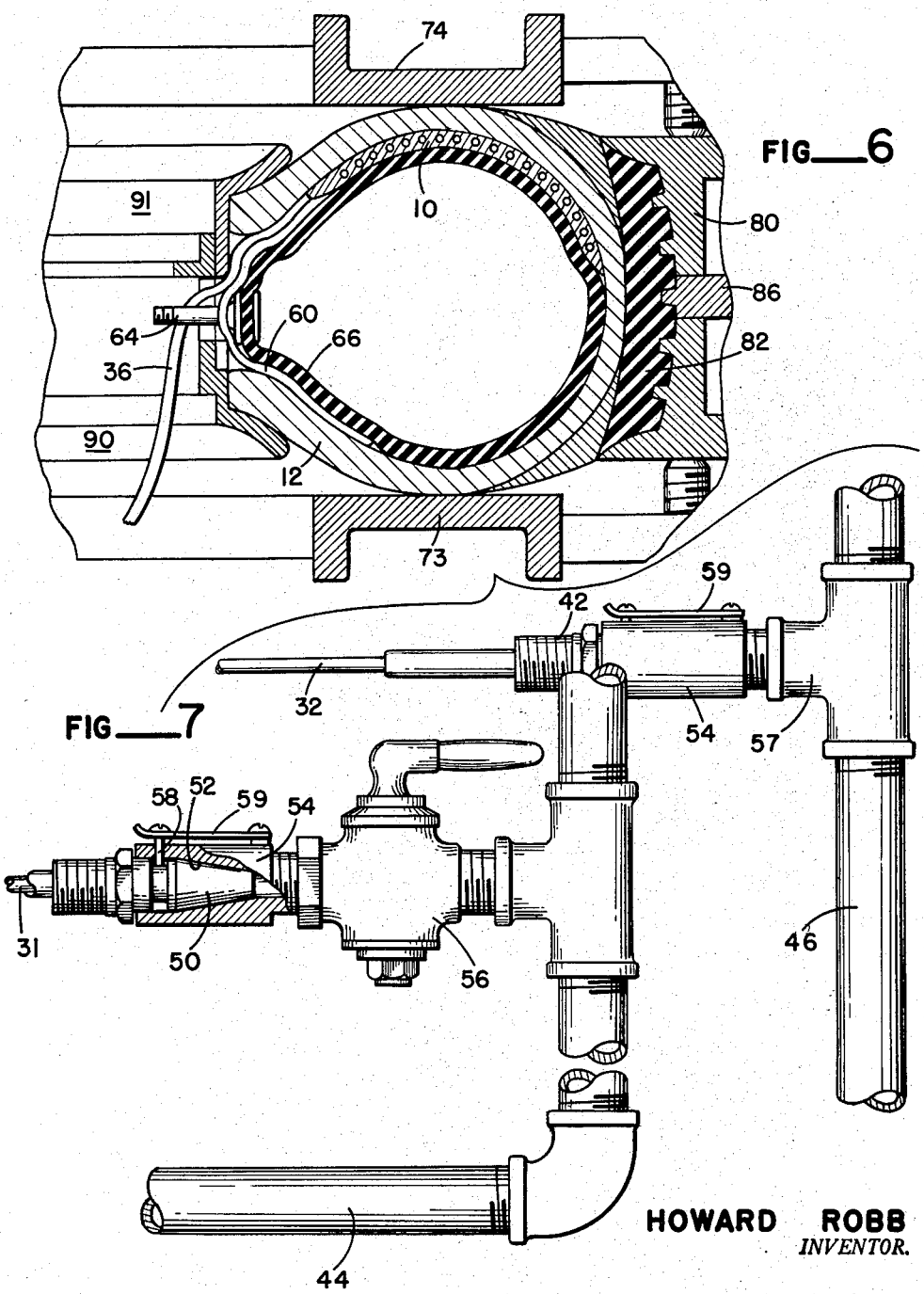

United States Patent Office 2,797,438
Patented July 2, 1957

2,797,438

STEAM HEATED PATCHING MEANS FOR AUTOMOTIVE TIRE CASINGS

Howard Robb, Arlington, Wash.

Application July 6, 1954, Serial No. 441,319

2 Claims. (Cl. 18—18)

This present equipment relates to the repair of tire casings and more particularly contemplates the employment of a steam heated pad for use inside of the tire casing, especially when the casing is being recapped with a new tread in conventional tire capping machine equipment. To adapt this patch heater to work in association with the recapping press while the same is recapping a tire, means are provided so that the steam for heating may be connected freely to the same source of steam as is being used to cure the tire cap.

In the recapping of automotive tires, which is quite generally done at this time, it is found that quite often the tire casings are in good order except for possibly a single broken portion where the cord or fabric may be uncovered or the structure may have been broken through heavy use. It is, of course, necessary that this damaged spot be repaired in order to justify the expense of recapping or retreading the tire. In the past, this spot repair was normally an additional operation and this required considerable curing time, tied up an additional machine and very considerably delayed the completion of the tire capping work. In addition, it was necessary to have a complete unit to make these spot repairs in order that adequate heat and pressure be provided. With my present equipment, however, the backing which makes it possible to hold the pressure, which is normally provided by inflating a heavy duty inner tube, can now be had through the use of my pads in the expensive equipment necessary in the recapping of tires and which provides an excellent source of both pressure and heat. This large press equipment is part of any well equipped tire shop. Normally, the repair of broken side-wall or inside tread portions require less curing time than the thick camelback employed in recapping the tread portion, it is well within the capacity of my present equipment to insure that the repair, while made concurrently with the recapping, can easily be completed before the recapping curing period has expired. In this manner no more time is lost and except for the minor expense of providing for a supply of the heating steam which, of course, involves only the inexpensive pipe fittings, the tire repair shop is able to make a complete repair on a tire with very little investment additional in the necessary equipment to effect that repair.

The principal object of my present invention therefore, is to provide a steam heated spot repair pad for use on the inside of a tire casing during the period that the same is being recapped or retreaded.

A further object of my invention is to provide means for introducing steam to my hot pad and to provide means for the discharge of the used steam.

A further object is to provide for a circulatory steam heating circuit, taking steam from the steam supply line of a tire press, passing it through my pad and permitting the same to exhaust to the steam exhaust line of the tire press.

A further object is to provide, in a spot heating pad, means for passing the steam supply and discharge tubing through the tire tube valve stem opening of the tire rim.

Further objects, advantages and capabilities will be apparent from the description and disclosure in the drawings, or may be comprehended or are inherent in the device.

In the drawings:

Figure 1 is a plan view of my heating unit in which broken lines indicate the successive layers of rubber impregnated fabric which have been broken away to more fully illustrate the manner in which the heating tubes are arranged;

Figure 2 is a cross sectional view taken along the line 2—2 of Figure 1;

Figure 3 is a fragmentary, typical sectional view cutting three turns of the heating tubing and with the scale substantially enlarged so as to more fully illustrate the structure;

Figure 4 is a vertical cross sectional view illustrating the use of my heating pad with a conventional tire capping or retreading machine so as to show the ease with which my heating pad may be associated with the conventional tire capping equipment;

Figure 5 is an enlarged vertical cross sectional view illustrating, in part, the structure on the right hand side of Figure 4;

Figure 6 is a fragmentary cross sectional view, substantially the same as Figure 5 but, illustrating my heat pad in a different position in association with a tire casing secured in processing position; and Figure 7 is a bracketed, fragmentary view, illustrating the steam supply and return lines as normally found in the tire capping equipment of Figure 4 but illustrating the manner in which convenient connections are made with this equipment and the control means further for varying the temperature of my heating pad.

Referring more particularly to the disclosure in the drawings, the numeral 10 designates generally the body of my heating pad which consists usually of a plurality of layers of fabric, preferably of the cord type, which are impregnated and fully covered with cured rubber. The outline shape of the pad is relatively unimportant and is largely a matter of choice to meet the need. Normally, a round outline or one slightly oval in shape is found to be most desirable. The preferred cross sectional shape is illustrated in Figure 2 in which it will be noted that the design is appreciably dished in cross section, the section of Figure 2 being typical and might be assumed as representative of the section on any of the diameters of the pad. As the pad is intended for use on the inside surface of a tire casing, as 12, it is desirable that the same be made tapering from the maximum thickness in the center, as at 27, to its outer edges 29, substantially after the showing of Figure 2 in which, for purposes of illustration, the central thickness is somewhat exaggerated.

Disposed within the built-up fabric pad are the tubular coils 14. These tubes are preferably of small inside diameter on the order of approximately 1/16 of an inch and should be formed of pliable, preferably nonferrous tubing. Certain of the annealed copper tubing functions most satisfactorily.

Referring to Figure 3, which is a substantially enlarged cross sectional view through the pad, it is to be noted that on the convex side 16, which lies against the patch being cured when this device is in use, I have found it convenient to employ a single ply of fabric, as 18, and on the concave side 20 in order to give increased rigidity to the pad, I prefer to employ two thicknesses of fabric, as 22 and 24. In the curing of the pad, the body is built up of rubber as at 26, and as the same is cured, the rubber fully impregnates all the fabric and flows in around the various turns of tubing 14 so that the tubes and the strengthening fabric as 18, 22, and 24, are one homogeneous mass to the end that the same can serve to a maximum in resisting any distortions, particularly changes in the spacing of the turns of tubing 14.

Referring particularly to Figures 1 and 2, it is desired to point out the precise manner in which tubing 14 is employed as a heating means for pad 10. To form the heating coils, a single piece of bendable tubing is employed and this is formed with a return bend as at 30 located normally at approximately the center of pad 10. From this point and disposed in a spiral arrangement of increasing diameter are the two legs of the tubing, as 31 and 32. One of these legs, as 31, may be considered the supply of steam under pressure and the other leg, as 32, as the exhaust for the spent steam. For reasons which will appear later in the specification, it has been found desirable to combine tubes 31 and 32 into a single flattened insulated covering, as 36. The opposite ends of tubing 14 which terminate the legs 31 and 42 are provided with special fitttings as 40 and 42, to the end that steam-tight connections can be quickly made when desired with the main steam supply line 44 and main steam exhaust line 46 which normally supplies steam for curing the tire as it is being recapped or retreaded. A satisfactory form of such a fitting is illustrated in Figure 7 in which it will be noted that a tapered end portion 50 is provided. This tapered tip is adapted to seat within a similarly tapered recess 52 within the adapter fitting 54. This adapter fitting is provided with a threaded portion so that it may be screwed into any standard pipe fitting as the control valve 56 or a standard pipe T 57. To hold the tapered portion seated against the steam pressure of supply line 44, a spring controlled detent 58 is employed and this is normally urged into a restraining position by the leaf spring 59.

In order to position pad 10 within the casing cavity, especially during the assembly period, it has been found desirable to provide a flexible rubber tongue at 60 formed either as part of pad 10 or fixedly secured to the same. This tongue is provided with a plurality of through openings 62 of a size convenient for passing over the valve stem 64 of the inner tube 66 which is, in turn, used to build up the required pressure within the tire casing and thus supply the pressure required for the curing of the rubber, both in the patch being cured and for curing the re-tread or re-cap portion of the tire.

My heating pad is intended primarily for use with the standard type of recapping or retreading machines of which the showing of Figure 4 may be considered as typical. Such a unit consists of a base portion 70 normally supported from the floor by a plurality of posts, as 72. Usually formed as part of the base is the tire supporting annular ring plate 73. On the opposite side of tire casing 12 is a second annular pressure plate formed as a ring, indicated at 74. This ring is suitably strengthened, as by ribs 75, so that by means of screw 76 and the spoke-like handle 78 adequate pressure can be applied to the opposite sides of the tire casing.

Adapted to engage the periphery of the tire is the heating ring 80. This ring is normally made in sections to facilitate its removal, particularly in the case where cross patterns occur in the tire tread 82. To hold the heating members 80 in place is a second solid circular member 84. This member holds the segmental ring 88 in position and, being hollow, serves to supply and distribute the heating steam to heating ring 80. The steam supply pipe 40 and the steam exhaust pipe 46 are connected to distributor rings 84, after the showing of Figure 4. It will be noted that distributor 84 is provided with two separate angular steam passageways throughout the entire circumference, one for the live steam and one for the exhaust steam. Heating members 80, however, are divided throughout a semi-circumference by a divider member 86, and this is interrupted, normally only at 87, so as to provide for an equalization of pressure and steam flow.

The center of the tire is supported by, normally, a special two-part tire rim formed of the two circular portions 90 and 91. This is, as a rule, the preferred arrangement in tire recapping and retreading equipment, although sometimes the standard rim of the tire is used and my heating pad can normally be used with this standard rim, if the occasion arises. The tire rim of whichever style must, of necessity, be provided with a valve stem opening as 92, so that the valve stem 64 can pass therethrough so that air pressure can be applied through the valve stem to inflate the inner tube 66, and at the end of the curing process, the tire can be deflated by the same means. My heating pad 10 takes into account that there is normally only one opening through the tire rim and consequently the heating tubing 14 has its two ends 31 and 32 enclosed in a somewhat flexible but flat arrangement of heat insulating covering 36. Such an arrangement lends itself very well to being passed out through opening 92. It is desirable to point out that the tubes at their terminal fittings 40 and 42 must be of a size and one of the tubes 30 and 32 must be longer than the other so that the fittings may also be passed out through opening 92, but before valve stem 64 is brought out through the opening. In extreme cases the terminal fittings 40 and 42 may need to be removed to pass the tubes through opening 92.

In placing the tire on rim 90—91, the point requiring repair to the carcass of the casing should be positioned near the valve stem opening, as it is desirable that a minimum run of tubing be used within the tire casing, otherwise even the insulating covering 36 around the tubing might not be sufficient to prevent unwanted local heating of either the carcass or the inner tube 66. It is to be noted that Figures 5 and 6 show different positions of the heating pad. Figure 5 illustrates the pad position when a break has occured near the tread portion of the carcass, while Figure 6 shows the more prevalent repair, namely, that of repairing the thin sidewall portions of the casing. These two positions further show different adjusted positions of the flexible tongue 60 which has been found to be a great aid in insuring that the heating pad will not be shifted from its desired position in the final closing of the mold and inflating of tube 66.

With the tire in its final position for curing, as is illustrated in Figures 4, 5 and 6, terminals 40 and 42 are suitably connected to the supply pipe 44 and the discharge or exhaust pipe 46, and control of the curing temperature induced into pad 10 may be achieved by valve 56. In some cases it may not be desirable to connect tube terminal 32 to the discharge pipe 46, this is especially true when the pressure drops, due to the small tube diameter, does not limit the control of temperature within the pad.

It is believed that it will be clearly apparent from the above description and the disclosure in the drawings that the invention comprehends a novel construction of a steam heated patching means for automotive tire casings.

Having thus disclosed my invention, I claim:

1. In a tire capping assembly in which a tire casing has its tread pressed against an annular steam jacket and in which a tire rim is positioned in the center of said tire supporting the inner edges thereof, the combination therewith of patching means for the inner casing walls, comprising: a pliable flattened heating pad positioned in said casing abutting the inner wall to be patched, said tire rim having a valve stem opening therethrough and a matrix inner tube positioned in said casing and having a valve stem positioned in said valve stem opening, said pad having a resilient tongue extending from one edge thereof and having a plurality of openings in its end portion and said valve stem being positioned in one of said tongue openings to hold said pad in position in said casing, and a pliable steam-conducting tube having its major portion wound in said pad and having its ends extending outwardly therefrom through said valve stem opening and the end portions being covered by a flattened coating protecting the tube.

2. In a tire recapping assembly in which a tire casing has its tread pressed against an annular steam jacket and in which a tire rim is positioned in the center of said tire supporting the inner edges thereof, the combination therewith of patching means for the inner casing walls, comprising: a flattened heating pad positioned in said casing abutting the area to be patched, said tire rim having a valve stem opening therethrough and a matrix inner tube positioned in said casing and having a valve stem positioned in said opening, said pad having a resilient tongue extending from one edge thereof and having an opening in its end portion and said valve stem being positioned in said tongue opening to hold said pad in position in said casing, and a steam-conducting tube means wound in said pad and having an extension passing outwardly therefrom through said valve-stem opening.

References Cited in the file of this patent

UNITED STATES PATENTS

| | | |
|---|---|---|
| 1,548,215 | Semler | Aug. 4, 1925 |
| 1,620,435 | Burdette | Mar. 8, 1927 |
| 1,630,457 | Wheelock | May 31, 1927 |
| 1,682,619 | Turner | Aug. 28, 1928 |
| 1,839,877 | Heintz | Jan. 5, 1932 |
| 1,866,832 | Woock | July 12, 1932 |
| 1,923,736 | Lewis et al. | Aug. 22, 1933 |
| 2,335,878 | Oren | Dec. 7, 1943 |